United States Patent
Koyama et al.

(10) Patent No.: US 8,183,940 B2
(45) Date of Patent: May 22, 2012

(54) TEMPERATURE CONTROL DEVICE

(75) Inventors: Yoshito Koyama, Kawasaki (JP); Minoru Hirahara, Kawasaki (JP); Koji Nakamuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 286 days.

(21) Appl. No.: 12/549,658

(22) Filed: Aug. 28, 2009

(65) Prior Publication Data

US 2010/0052801 A1  Mar. 4, 2010

(30) Foreign Application Priority Data

Aug. 29, 2008  (JP) ................. 2008-222242

(51) Int. Cl.
  *H03L 1/04*  (2006.01)
(52) U.S. Cl. ............ 331/69; 331/66; 331/70; 331/176
(58) Field of Classification Search .............. 331/66, 331/69, 70, 176
  See application file for complete search history.

(56) References Cited

U.S. PATENT DOCUMENTS

2009/0206073 A1* 8/2009 Kinoshita et al. ............. 219/715
2010/0294021 A1* 11/2010 Makino et al. ............... 73/25.03

FOREIGN PATENT DOCUMENTS

JP  2003-241565 A  8/2003
JP  2005-092302 A  4/2005

* cited by examiner

*Primary Examiner* — James E Goodley
(74) *Attorney, Agent, or Firm* — Westerman, Hattori, Daniels & Adrian, LLP

(57) ABSTRACT

A thermostatic-chamber temperature control device includes: a heating element for heating a thermostatic chamber; a bridge circuit having a temperature sensitive element whose resistance value varies in accordance with the temperature of the heating element; a detection circuit for detecting an unbalanced voltage of the bridge circuit; a PWM signal generating circuit for generating a PWM signal corresponding to the unbalanced voltage detected by the detection circuit; and a switching element that has a current output terminal connected to the heating element and a current input terminal connected to a power supply circuit and is driven on the basis of the PWM signal generated by the PWM signal generating circuit.

4 Claims, 9 Drawing Sheets

TEMPERATURE CONTROL DEVICE

CROSS-REFERENCE TO RELATED APPLICATION

This application is based upon and claims the benefit of priority from the prior Japanese Patent Application No. 2008-222242 filed on Aug. 29, 2008, the entire contents of which are incorporated herein by reference.

FIELD

The present invention relates to a temperature control device for keeping the temperature of a thermostatic chamber of a highly stable oscillator constant.

BACKGROUND

A highly stable oscillator is an oscillator which can perform stable oscillation by keeping the temperature of an atomic resonator for determining an oscillation frequency to a constant value. For example, OCXO (Oven Controlled Xtal Oscillator: temperature-controlled type crystal oscillator) and a rubidium atomic oscillator are known as such a highly stable oscillator.

FIGS. 1A and 1B are diagrams showing the construction of a general highly stable oscillator, wherein FIG. 1A is a diagram showing the construction of OCXO, and FIG. 1B is a diagram showing the construction of a rubidium atomic oscillator.

As shown in FIG. 1A, OCXO contains a thermostatic chamber 2 in which a crystal oscillator 1 serving as a atomic resonator is mounted, and an oscillation circuit network 3, and the temperature of the crystal oscillator 1 is kept constant with respect to the external ambient temperature in the thermostatic chamber 2. In OCXO, an oscillation signal based on the natural vibration frequency of the crystal oscillator 1 is input to the oscillation circuit network 3, and an oscillation output is output from the oscillation circuit network 3.

In such OCXO, a heater is disposed in the thermostatic chamber 2, and a control device for keeping the temperature of the heater constant is disposed in the thermostatic chamber 2 or the oscillation circuit network 3, for example. The control device will be described later with reference to FIG. 2.

As shown in FIG. 1B, the rubidium atomic oscillator contains thermostatic chambers 2A, 2B and 2C. A rubidium lamp cell 4 serving as an atomic resonator is mounted in the thermostatic chamber 2A, a filter cell 5 is mounted in the thermostatic chamber 2B, and a resonance gas cell 6 and a cavity resonator 7 are mounted in the thermostatic chamber 2C. Accordingly, each of the rubidium lamp cell 4, the filter cell 5, the resonance gas cell 6 and the cavity resonator 7 is kept to a constant temperature. Gas cell transmission light output from the resonance gas cell 6 is subjected to photoelectrical conversion in a photocell 8, passed through a preamplifier 9 and then input to the oscillation circuit network 3. An oscillation output is output from the oscillation circuit network 3.

In the rubidium atomic oscillator as described above, heaters are disposed in the thermostatic chambers 2A to 2C, and a control device for keeping the temperature of the heater constant is disposed in each of the thermostatic chambers 2A to 2C or the oscillation circuit network 3, for example. The control device will be described later with reference to FIG. 2.

As described above, according to the highly stable oscillator, the atomic resonator for determining the oscillation frequency is kept to a stable and constant temperature with respect to the external ambient temperature, thereby stabilizing the oscillation frequency of the oscillation output.

Here, in general, the temperature characteristic of the crystal oscillator of OCXO is determined by cut angle, and thus the set temperature (target value) of the thermostatic chamber 2 is frequently set to 70° C. or more in accordance with the ambient temperature of equipment to which the highly stable oscillator is applied. It is a rare case that the set temperature of the thermostatic chamber 2 of OCXO exceeds 100° C. at most. The set temperatures of the thermostatic chambers 2A to 2C of the rubidium atomic oscillator are generally set to 70° C. to 120° C.

As described above, the set temperature of the thermostatic chamber of the highly stable oscillator is generally set to 70° C. or more, and the upper limit temperature based on the environmental condition of the applied equipment is generally equal to 70° C. or less. Therefore, a heat type temperature control circuit is used as the temperature control circuit of the highly stable oscillator.

In the case of a highly stable oscillator in which the set temperature of the thermostatic chamber is relatively low (for example, 25° C.), a Peltier device which can increase or reduce the temperature is frequently used.

However, the heat efficiency for reduction of temperature is lower than that for increase of temperature, and thus there is a drawback that the highly stable oscillator is designed in a large scale. Since OCXO and the atomic oscillator are generally restricted in use space, a cooling type thermostatic chamber is not used, but a temperature increasing type thermostatic chamber is used.

The circumstances surrounding highly stable oscillators such as OCXO and the rubidium atomic oscillator have been recently severe, and further miniaturization has been required. Furthermore, high speed and high capacity designs have been promoted in equipment such as a computer and a server to which highly stable oscillators are applied, and thus the internal temperature of the equipment is increased. Therefore, the highly stable oscillators have been required to withstand a higher ambient temperature.

Here, in order to withstand a higher ambient temperature, the setting temperature of the thermostatic chamber is required to be increased. This is because a highly stable oscillator must be designed in a large scale when a cooling type thermostatic chamber is used, and thus a temperature increasing type thermostatic chamber is enabled to be used by setting the set temperature to a value higher than the ambient temperature, thereby avoiding the large-scale design of the highly stable oscillator.

The change of the temperature characteristic of the atomic resonator which is required in such a case as described above is implemented by changing the cut angle of the crystal oscillator in the case of OCXO and by changing the kind, pressure or the like of filler gas in the rubidium lamp, the filter cell and the gas cell in the case of the rubidium atomic oscillator.

FIG. 2 is a diagram showing the construction of a thermostatic-chamber temperature control device for performing temperature control of a thermostatic chamber of a general highly stable oscillator.

A conventional thermostatic-chamber temperature control device contains a heater 10 for increasing the temperature of the thermostatic chamber, a bridge circuit 11 having a temperature sensitive element 11A, an operational amplifier 12 for outputting the voltage corresponding to an unbalanced voltage of the bridge circuit 11, and a transistor 13 having a base to which the output of the operational amplifier 12 is output.

The heater 10 is a heater wire for keeping the temperature of the thermostatic chamber constant, and it is secured to the housing of the thermostatic chamber. The heater 10 is connected between a power supply (Vcc) and the collector of the transistor 13.

The temperature sensitive element 11A is an element such as a thermistor whose resistance value varies in accordance with the surrounding temperature, and it is provided to detect the temperature of the heater 10. The temperature sensitive element 11A is installed in the bridge circuit 11 disposed between the power supply (Vcc) and the operational amplifier 12.

The bridge circuit 11 is disposed between the power supply (Vcc) and the operational amplifier 12. The bridge circuit 11 contains the temperature sensitive element 11A and three fixed resistors, and is disposed so that the unbalanced voltage thereof is input to the input terminal of the operational amplifier. Here, when the resistance value of the temperature sensitive element 11A is represented by $Rt(\Omega)$ and the resistance values of the three fixed resistors are represented by $Ra(\Omega)$, $Rb(\Omega)$ and $Rc(\Omega)$ respectively, the balance condition of the bridge circuit 11 is represented by $Rt=Ra \times Rc/Rb$. The resistance value Rt of the temperature sensitive element 11A is set so as to be equal to $Ra \times Rc/Rb(\Omega)$ when the temperature of the thermostatic chamber is equal to the set temperature as the target value.

The base of the transistor 13 is connected to the output terminal of the operational amplifier 12, the collector of the transistor 13 is connected to the power supply (Vcc) through the heater 10, and the emitter of the transistor 13 is connected to the ground.

The operational amplifier 12 contains resistors R1 and R2 and a capacitor (C0) for voltage division, and a resistor R3 is connected between the operational amplifier 12 and the transistor 13.

In the thermostatic-chamber temperature control device as described above, when the temperature of the thermostatic chamber decreases in connection with decrease of the ambient temperature and thus an unbalanced voltage is output, the transistor 13 is driven in accordance with the output of the operational amplifier 12. When the transistor 13 is turned on and thus collector current flows, the heater 10 is turned on, and the temperature of the thermostatic chamber is increased. When the temperature of the thermostatic chamber reaches a target value, the unbalanced voltage is equal to zero, and thus the transistor 13 is turned off. As described above, the temperature of the thermostatic chamber is kept constant.

Next, the relationship of the ambient temperature of the thermostatic chamber and each of the current flowing in the heater 10 (heater current), the power consumption of the heater 10 and the power consumption of the transistor 13 will be described.

FIG. 3 is a characteristic diagram showing the relationship of the heater current and the power consumption with respect to the ambient temperature of the thermostatic chamber. In the characteristic diagram shown in FIG. 3, the abscissa axis represents the ambient temperature, the ordinate axis at the left side represents the power consumption of the heater 10, and the ordinate axis at the right side represents the current value of the heater 10.

When the ambient temperature of the thermostatic chamber increases, the unbalanced voltage of the bridge circuit 11 decreases, so that the transistor 13 is driven to reduce the heater current. On the other hand, when the ambient temperature decreases, the unbalanced voltage of the bridge circuit 11 increases, so that the transistor 13 is driven to increase the heater current. Here, the power consumed in the heater 10 is obtained by multiplying the square of the current flowing in the heater 10 by the resistance value of the heater 10.

The power consumption of the transistor 13 is shown in FIG. 4.

FIG. 4 is a characteristic diagram showing the power consumption of the transistor with respect to the ambient temperature. In FIG. 4, the abscissa axis represents the ambient temperature, and the ordinate axis represents the power consumption of the transistor 13. It is assumed that the set temperature (target value) of the thermostatic chamber is set to 80° C.

When the power supply voltage is represented by Vcc(V), the heater current is represented by I(A), the resistance value of the heater 10 is represented by $RH(\Omega)$, the voltage between the collector and the emitter is represented by VCE(V) and the voltage drop in the heater 10 is represented by $RH \times I(V)$, the power supply voltage Vcc is constant, and thus VCE is represented by the following formula (2).

$$VCE = Vcc - RH \times I \tag{2}$$

Therefore, the power consumption Ptr(W) in the transistor 13 is determined according to the following formula (3).

$$Ptr = (Vcc - RH \times I) \times I \tag{3}$$

Accordingly, it is apparent that the power consumption in the transistor 13 is maximum when the current I is equal to a half of the maximum current value as shown in FIG. 4.

Here, when the ambient temperature is equal to 0° C., the resistance value between the collector and the emitter of the transistor 13 is substantially equal to zero. Therefore, the power consumption of the transistor 13 is equal to zero as shown in FIG. 4. At this time (when the ambient temperature is equal to 0° C.), the power consumption of the heater 10 is maximum (Vcc2/RH).

Furthermore, when the ambient temperature is equal to the set temperature, that is, 80° C., the transistor 13 is turned off, and no current flows in the heater 10, so that the power consumption of the transistor 13 is equal to zero.

Accordingly, in the case where the set temperature of the thermostatic chamber is set to 80° C., it is found that the power consumption of the transistor 13 is maximum when the ambient temperature is about 40° C.

The maximum power consumption of the transistor 13 is equal to about a quarter of the maximum consumption power of the heater 10.

Next, reliability of the transistor 13 will be considered. In general, an upper limit under a use environment which is represented as a junction temperature (for example, 150° C.) is set to the chip temperature of a transistor.

When the ambient temperature of the transistor 13 is represented by TA(° C.), the thermal resistance is represented by $\theta jA$(° C./W) and the power consumption of the transistor is represented by Ptr(W), the temperature Ttr(° C.) of the transistor 13 in the thermostatic-chamber temperature control device shown in FIG. 2 is represented by the following formula (4).

$$Ttr = TA + \theta jA \times Ptr \tag{4}$$

The thermal resistance $\theta jA$ is a value which also varies in accordance with a transistor chip being used, the pattern of a print board on which the transistor chip is mounted or radiation heat from a portion at which the transistor chip is disposed, and the value obtained by multiplying the thermal resistance $\theta jA$ by the power consumption of the transistor 13 shown in FIG. 4 approximately corresponds to the temperature increase of the transistor chip. In light of the characteristics shown in FIG. 4, the power consumption of the transistor 13 is maximum around the half temperature point of the set temperature of the thermostatic chamber. Therefore, the chip temperature of the transistor 13 is estimated to be maximum at the center temperature of the use environment. This is also satisfied in a case where a FET (Field Effect Transistor) is used in place of the transistor 13.

The highly stable oscillators have been recently required to be further miniaturized. Therefore, it is impossible to physically separate the thermostatic chamber from a switching element such as the transistor or FET for driving the heater.

When the thermostatic chamber and the switching element are in close proximity to each other as described above, the switching element suffers thermal conduction from the thermostatic chamber, and heating of the switching element itself is also added, so that the chip temperature of the switching element may be equal to the temperature of the thermostatic chamber or more.

The increase of the chip temperature of the switching element promotes deterioration of the switching element formed of a semiconductor, and the lifetime of the switching element is shortened, which may cause problems such as long-term reliability degradation.

Particularly, miniaturization of equipment and diversification of the types of applied equipment have been increasingly required for recent highly stable oscillators, and thus a thermostatic-chamber temperature control device having higher reliability has been required to be developed.

SUMMARY

According to an embodiment of the present invention, a thermostatic-chamber temperature control device includes: a heating element for heating a thermostatic chamber; a bridge circuit having a temperature sensitive element whose resistance value varies in accordance with the temperature of the heating element; a detection circuit for detecting an unbalanced voltage of the bridge circuit; a PWM signal generating circuit for generating a PWM signal corresponding to the unbalanced voltage detected by the detection circuit; and a switching element that has a current output terminal connected to the heating element and a current input terminal connected to a power supply circuit and is driven on the basis of the PWM signal generated by the PWM signal generating circuit.

It is to be understood that both the foregoing general description and the following detailed description are exemplary and explanatory and are not restrictive of the invention, as claimed.

DETAILED DESCRIPTION OF EXAMPLE EMBODIMENTS

Embodiments applied to a thermostatic-chamber temperature control device according to the present invention will be described.

First Embodiment

Figure 5:
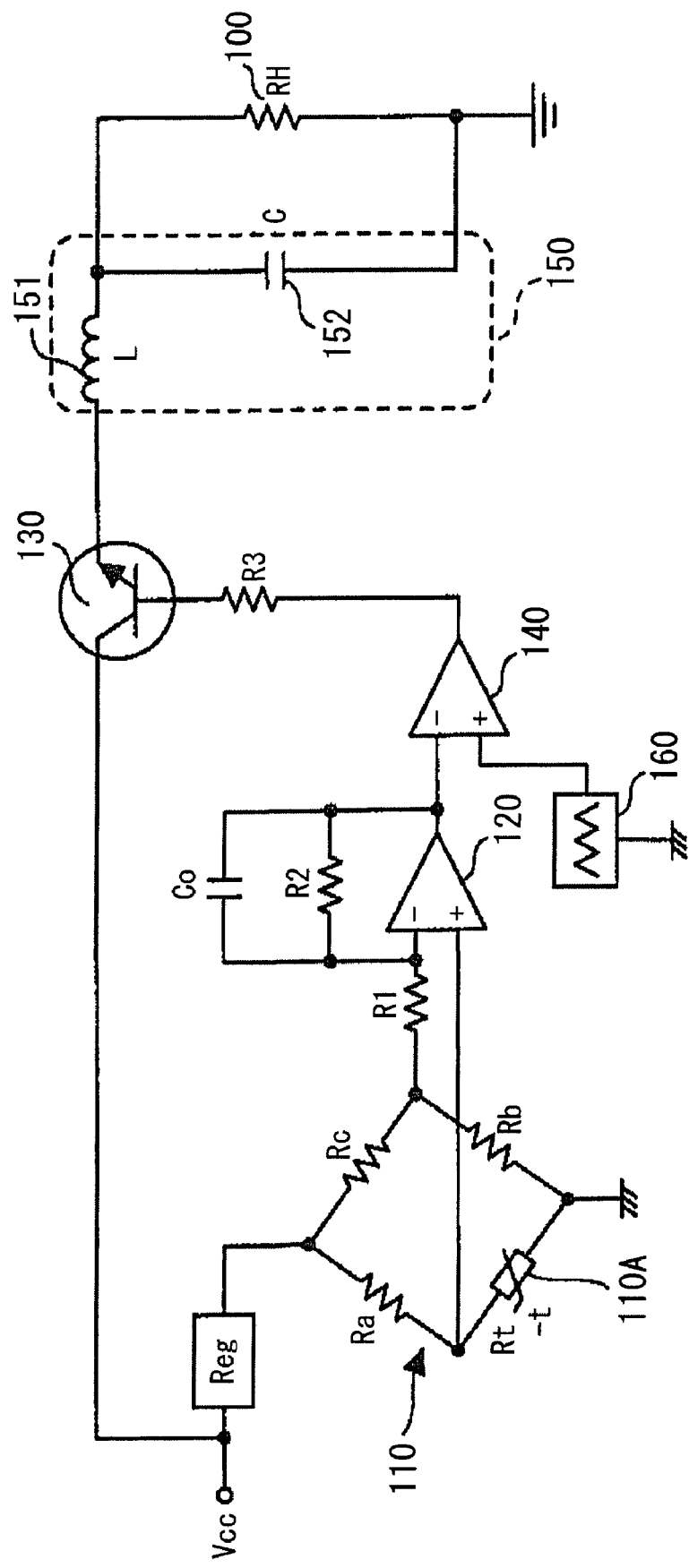
FIG. 5 is a diagram showing an example of the circuit construction of the thermostatic-chamber temperature control device according to a first embodiment.

FIG. 5 is a diagram showing a circuit construction of a thermostatic-chamber temperature control device according to a first embodiment.

The thermostatic-camber temperature control device according to the first embodiment contains a heater 100, a bridge circuit 110 having a temperature sensitive element 110A, an operational amplifier 120, a transistor 130, a comparator 140, a smoothing filter 150, and a triangular wave oscillator 160. The thermostatic-chamber temperature control device according to the first embodiment is manufactured as a discrete part.

The heater 100 is a heating element disposed to keep the temperature of the thermostatic chamber constant, and for example, it may be a heater wire such as a nichrome wire. One end of the heater 100 is connected to the midpoint between a coil 151 and a capacitor 152 of the smoothing filter 150, and the other end thereof is grounded.

Figure 1A:
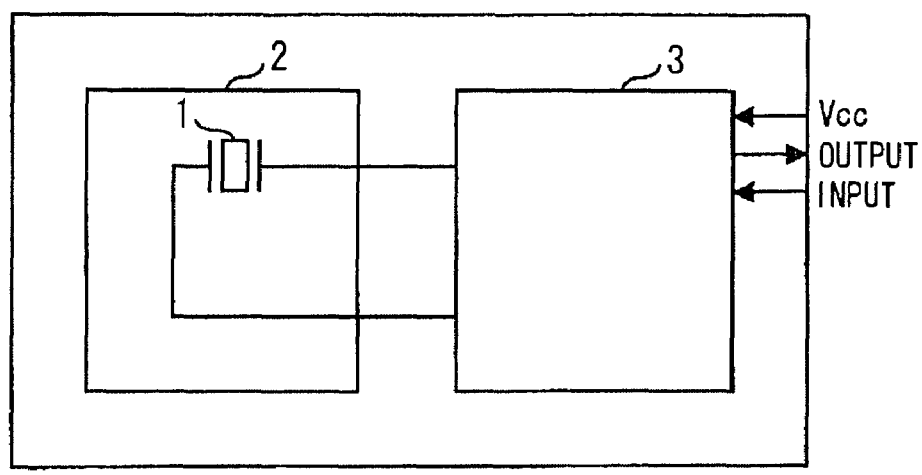
FIG. 1A is a diagram showing an example of the construction of OCXO in a general highly stable oscillator.
Figure 1B:
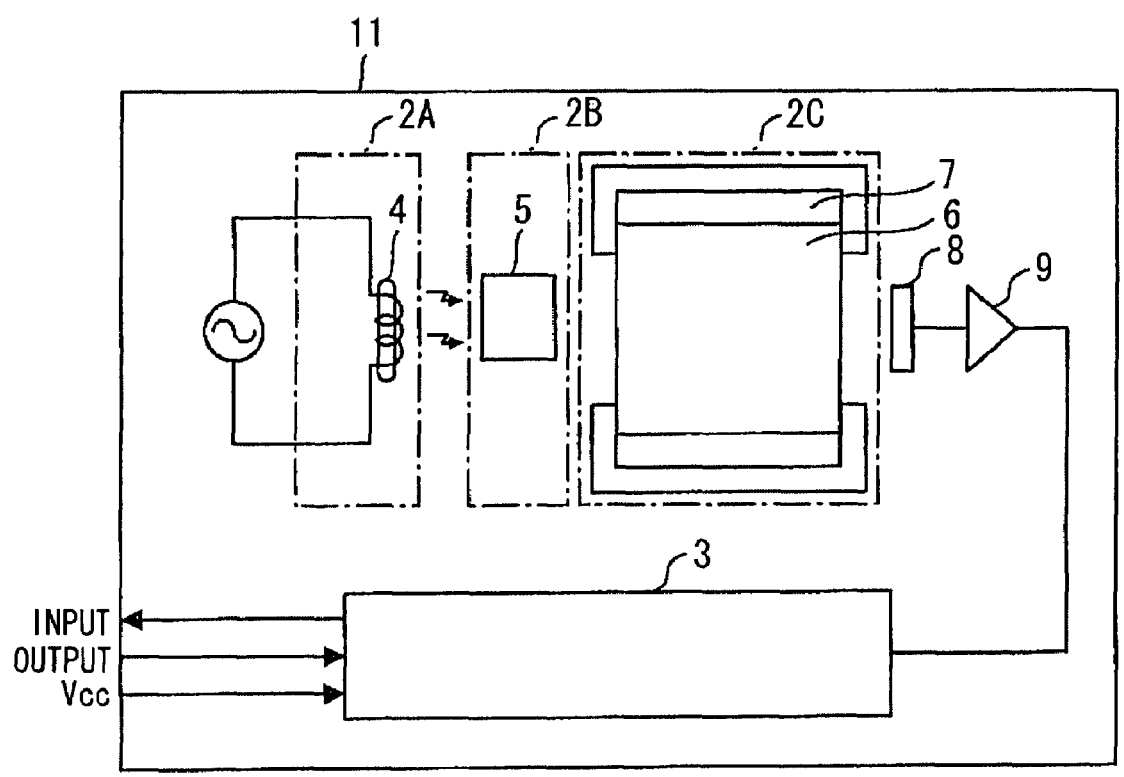
FIG. 1B is a diagram showing an example of the construction of a rubidium atomic oscillator in the general highly stable oscillator.

The heater 100 is disposed in the housing of the thermostatic chamber. The construction of the thermostatic chamber itself may be the same as the thermostatic chamber 2 or 2A to 2C shown in FIGS. 1A and 1B described in "Background". The highly stable oscillator is miniaturized, and the thermostatic-chamber temperature control device is disposed in the highly stable oscillator. Therefore, the transistor 13 is in proximity to the heater 100 to the extent that it suffers thermal conduction.

The bridge circuit 110 is connected to a power supply (Vcc) through a regulator (Reg), and contains a temperature sensitive element 110A and three fixed resistors. The bridge circuit 110 is a circuit for converting heat (temperature) transmitted to the temperature sensitive element 110A to a voltage signal called an unbalanced voltage. The output terminal of the bridge circuit 110 is connected to the input terminal of the operational amplifier 120, and the unbalanced voltage is input to the operational amplifier 120.

The temperature sensitive element 110A is an element whose resistance value varies in accordance with the temperature, and it may be secured in the neighborhood of the thermostatic chamber so that the temperature of the thermostatic chamber can be detected. A thermistor or a platinum resistor may be used as the temperature sensitive element 110A, for example.

Figure 2:
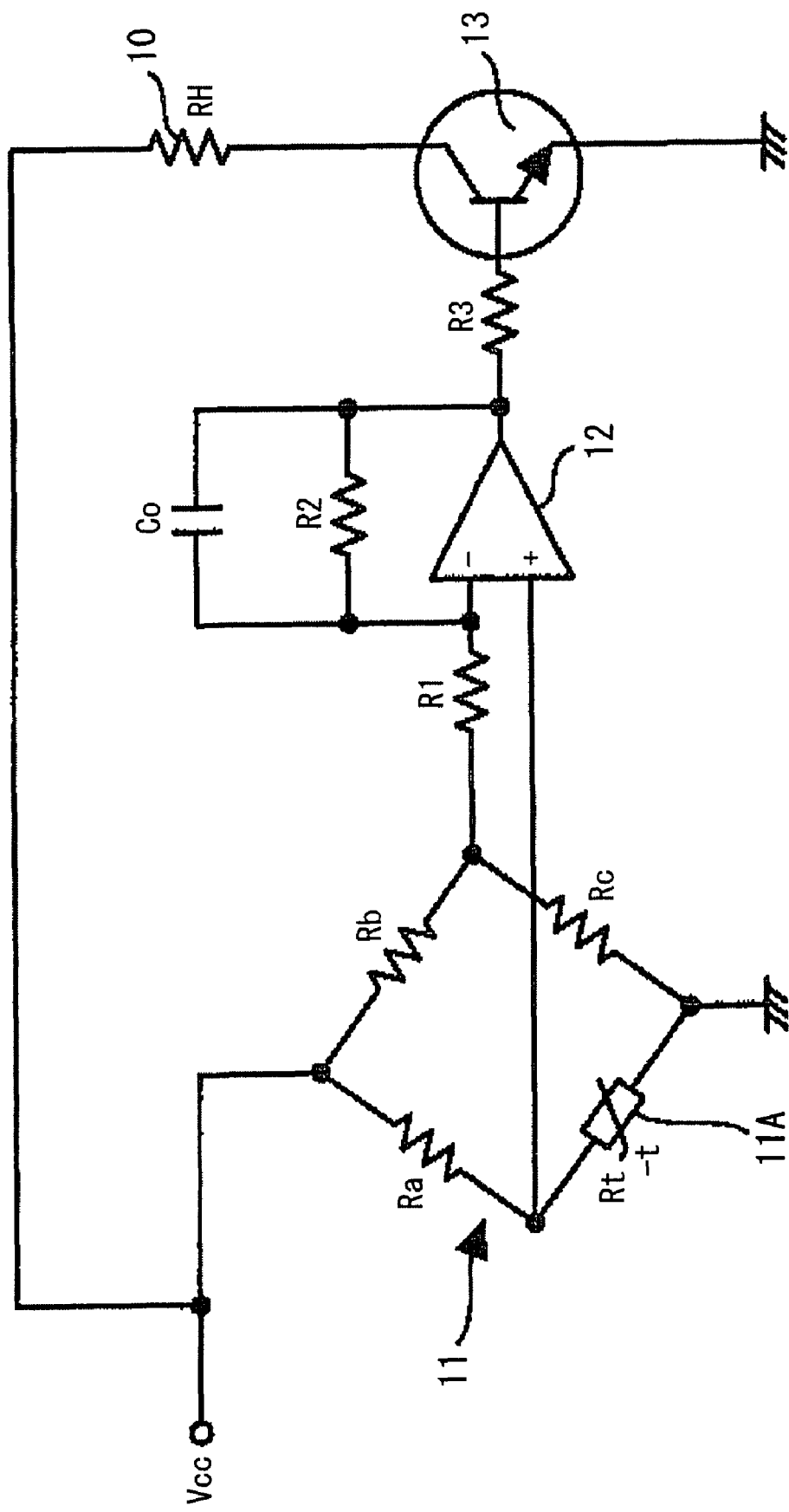
FIG. 2 is a diagram showing an example of the construction of a thermostatic-chamber temperature control device of the general highly stable oscillator.
Figure 3:
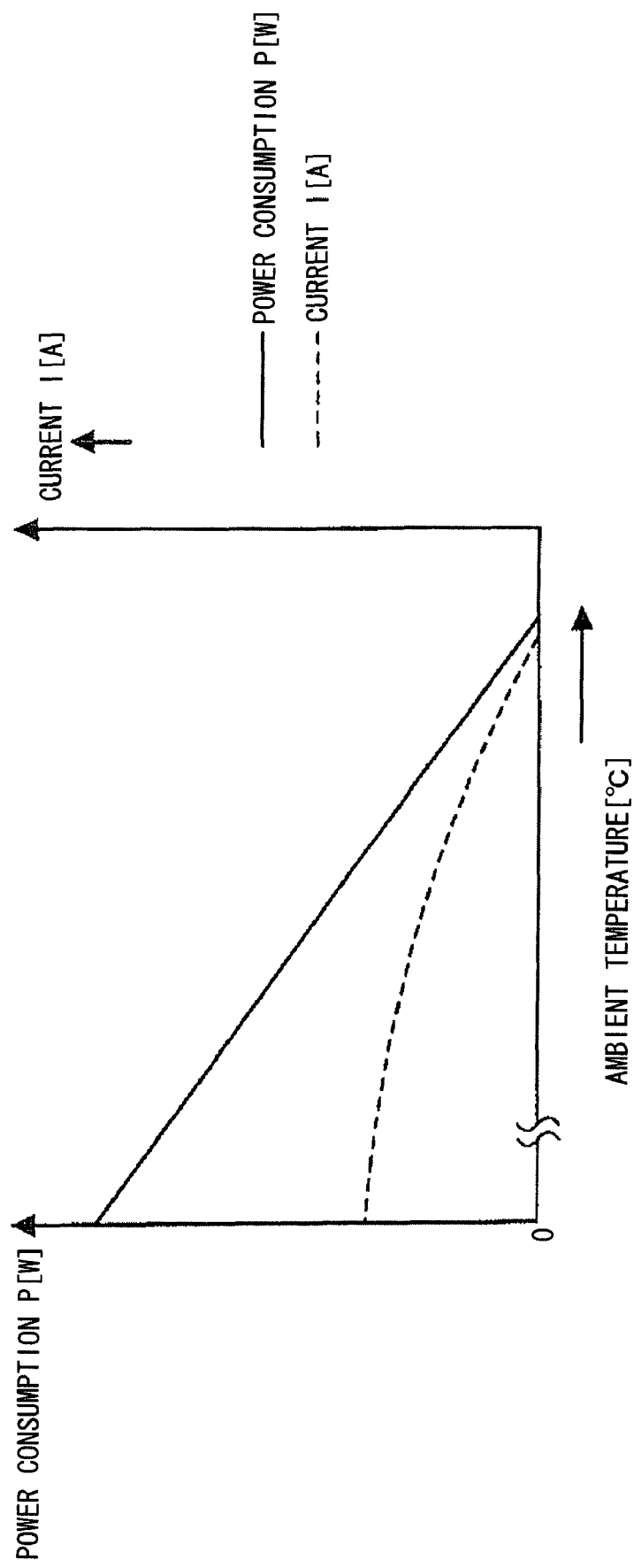
FIG. 3 is a characteristic diagram showing the relationship of heater current and power consumption with respect to the ambient temperature of a thermostatic chamber.
Figure 4:
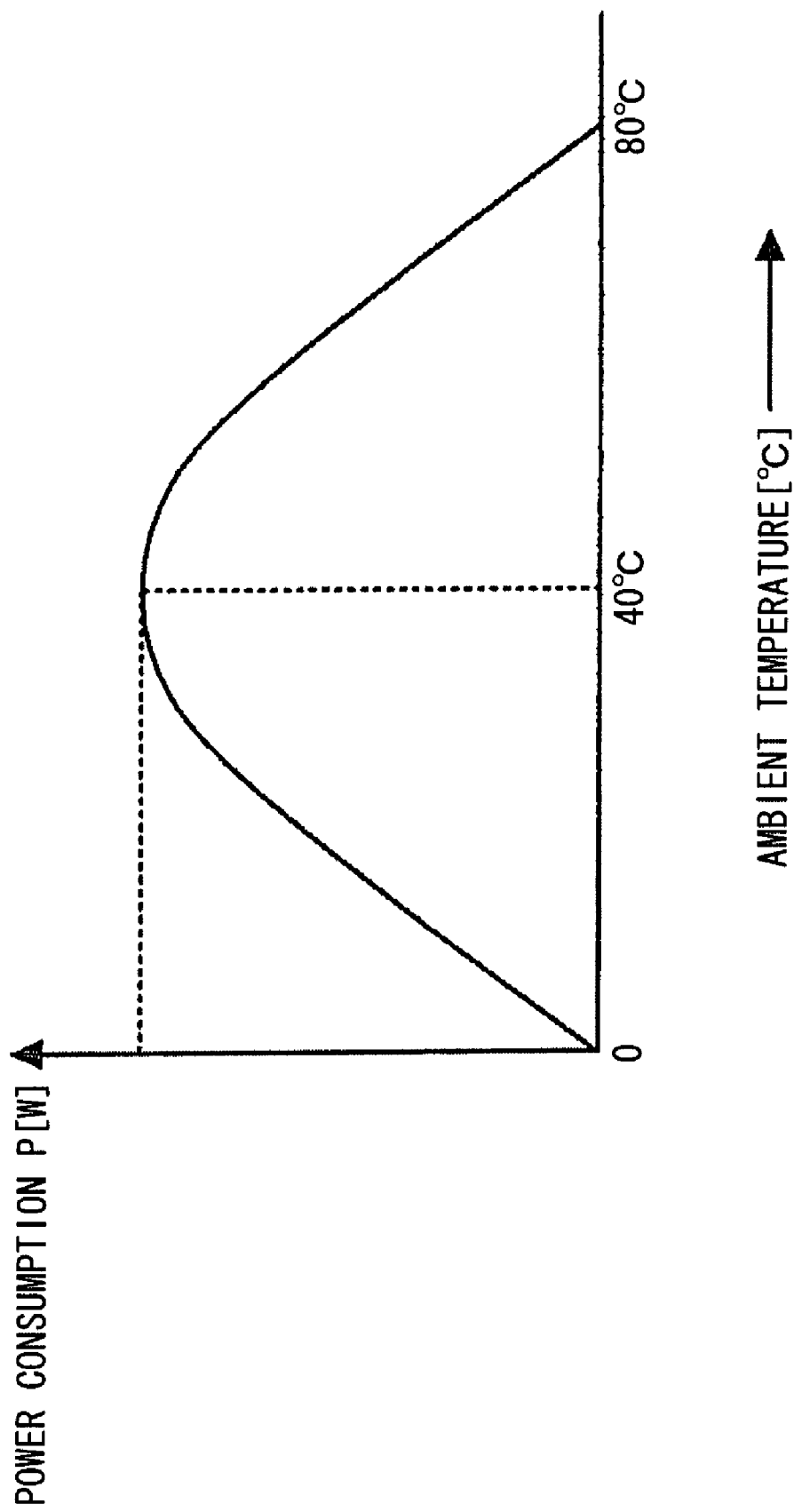
FIG. 4 is a characteristic diagram showing the power consumption of the transistor with respect to the ambient temperature.

The construction of the bridge circuit 110 containing the temperature sensitive element 110A and the three resistors is identical to that of the bridge circuit 11 shown in FIG. 2 (background), and the resistance value Rt of the temperature sensitive element 110A is set to satisfy Rt=Ra×Rc/Rb(Ω) when the temperature of the thermostatic chamber is equal to the set temperature as a target value.

The operational amplifier 120 is a detection circuit for detecting the unbalanced voltage input from the bridge circuit 110, and it amplifies the unbalanced voltage and outputs the voltage corresponding to the unbalanced voltage. The operational amplifier 120 has resistors R1 and R2 and a capacitor (C0) for voltage division.

The transistor 130 is a switching element for driving the heater 100. With respect to the transistor 130, the collector as a current input terminal is connected to the power supply (Vcc), the emitter as a current output terminal is connected to the coil 151 of the smoothing filter 150, and the base as a control terminal is connected to the output terminal of the comparator 140 through the resistor R3. When a PWM (pulse width modulated) signal output from the comparator 140 is input to the base, resistance between the collector and the emitter is reduced, and current is supplied to the heater 100.

With respect to the comparator 140, an inverting input terminal is connected to the output terminal of the operational amplifier 120, and a non-inverting input terminal is connected to the triangular wave oscillator 160. The comparator 140 is a PWM signal generating circuit for outputting a PWM (Pulse Width Modulation) signal corresponding to a voltage value input from the operational amplifier 120. That is, the PWM signal output from the comparator 140 is a modulation signal which is synchronized with an oscillation frequency of the triangular wave oscillator 160 and has the pulse width corresponding to the unbalanced voltage of the bridge circuit 110.

The smoothing filter 150 contains the coil 151 and a capacitor 152, and smoothes the current supplied from the emitter of the transistor 130. The inductance of the coil 151 and the electrostatic capacity of the capacitor 152 are properly set in accordance with the voltage value of the power supply (Vcc) and the rated value of the heater 100.

The triangular wave oscillator 160 is a carrier generating circuit for generating a carrier signal to obtain a PWM signal in the comparator 140. The carrier is not limited to a triangular wave, but it may be a saw-tooth wave or a sinusoidal wave. Therefore, an oscillator which can generate a saw-tooth wave or sinusoidal wave may be used in place of the triangular oscillator 160.

In the thermostatic-chamber temperature control device according to the first embodiment as described above, when the temperature of the thermostatic chamber decreases together with the decrease of the ambient temperature and thus an unbalanced voltage is output from the bridge circuit 110, the PWM signal corresponding to the unbalanced voltage is output from the comparator 140. The PWM signal output from the comparator 140 is input to the base of the transistor 130, and thus the current corresponding to the PWM signal is output from the emitter of the transistor 130. The current from the emitter of the transistor 130 is passed through the smoothing filter 150 to be smoothed, and then supplied to the heater 100.

Accordingly, the heater 100 generates heat, and increases the temperature of the thermostatic chamber to the set temperature. When the temperature of the thermostatic chamber reaches the set temperature, the resistance value Rt of the temperature sensitive element 110A satisfies Rt=Ra×Rc/Rb, and thus the unbalanced voltage of the bridge circuit 110 is equal to zero. Accordingly, the duty ratio of the PWM signal output from the comparator 140 is equal to 0%, and the transistor 130 is turned off. The temperature of the thermostatic chamber is kept constant as described above.

As described above, according to the thermostatic-chamber temperature control device of the first embodiment, the transistor 130 for controlling the current supply to the heater 100 is driven on the basis of the PWM signal output from the comparator 140.

Here, the collector-emitter current and the base-emitter current flow through the transistor 130. The base-emitter current is more minute as compared with the collector-emitter current, and thus the base-emitter current is omitted in the following operation.

When the transistor 130 is turned on, the resistance value between the collector and the emitter of the transistor 130 is substantially equal to zero, and thus the power consumption of the transistor 130 is substantially equal to zero even when current flows between the collector and the emitter.

On the other hand, when the transistor 130 is turned off, the collector and the emitter are not conducted to each other, and the resistance value therebetween is very large. Accordingly, no current flows between the collector and the emitter and thus the power consumption of the transistor 130 is substantially equal to zero.

As described above, according to the thermostatic-chamber temperature control device of the first embodiment, the power consumption of the transistor 130 is substantially equal to zero irrespective of the ambient temperature.

In the conventional thermostatic-chamber temperature control device shown in FIG. 2, when there is any difference between the set temperature of the thermostatic chamber and the temperature detected by the temperature sensitive element 11A, the transistor 13 is turned on at all times and thus power consumption occurs. The maximum power consumption in the transistor of the conventional thermostatic-chamber temperature control device is equal to about a quarter of the maximum power consumption in the heater 10. This relation is derived from the following formula (1) when the power consumption of the transistor 13 is represented by Wtr, the voltage between the collector and the emitter is represented by Vce, the current flowing between the collector and the emitter is represented by I, the resistance value of the heater 10 is represented by RH and the power supply voltage is represented by Vcc (fixed value).

$$\begin{aligned} Wtr &= Vce \times I \\ &= Vtr \times (Vcc - Vtr)/RH \\ &= (Vcc \times Vtr - Vtr2)/RH \\ &= -(1/RH \times (Vtr2 - Vcc \times Vtr) \end{aligned} \quad (1)$$

Here, in the formula (1), Wtr=0 for Vtr=0 or Vtr=Vcc. The local maximum value (maximum value) of Wtr is obtained for Vtr=Vcc/2, and it is represented as Wtr=Vcc2/4RH. Accordingly, it is derived that the maximum power consumption in the transistor 13 of the conventional thermostatic-chamber temperature control device is equal to a quarter of the maximum power consumption (Vcc2/RH) in the heater 10.

On the other hand, with respect to the transistor 130 of the thermostatic-chamber temperature control device according to the first embodiment, the power consumption is substantially equal to zero irrespective of the ambient temperature, and thus the power consumption of the transistor 130 is reduced by about Vcc2/4RH at maximum as compared with the transistor 13 of the conventional thermostatic-chamber temperature control device.

Accordingly, the temperature increase of the transistor 130 of the thermostatic-chamber temperature control device according to the first embodiment is suppressed by the degree corresponding to the reduced power consumption as compared with the transistor of the conventional thermostatic-chamber temperature control device.

As described above, according to the first embodiment, the temperature increase of the transistor 130 can be suppressed more greatly as compared with the conventional thermostatic-chamber temperature control device, and thus there can be provided a thermostatic-chamber temperature control device which can maintain high reliability for a long term.

The temperature increase of the transistor 130 for driving the heater 100 can be suppressed, and thus a transistor which is more compact than that of the conventional thermostatic-chamber temperature control device can be used. Accordingly, the thermostatic-chamber temperature control device can be more miniaturized than the conventional one.

The foregoing description relates to the style using the NPN type transistor 130, however, the transistor 130 may be a PNP type transistor.

In the above embodiment, the transistor 130 is used as the switching element for controlling the current flowing through the heater 100. However, a FET (Field Effect Transistor) may be used in place of the transistor 130.

In the above embodiment, the comparator 140 is used as the PWM signal generating circuit for generating the PWM signal for driving the transistor 130. However, an operational amplifier may be used in place of the comparator 140.

In the above embodiment, the smoothing filter 150 is used. However, the smoothing filter 150 is not necessarily required, and a circuit construction containing no smoothing filter may be adopted.

In the above embodiment, the regulator (Reg) is used. However, the regulator (Reg) is not necessarily required, and a circuit construction containing no regulator may be adopted.

Furthermore, with respect to the connection relation of the power supply (Vcc), the heater 100, the transistor 130 and the smoothing filter 150 out of the constituent elements of the thermostatic-chamber temperature control device according to the first embodiment, not only the above circuit, but also circuits as shown in FIGS. 6A to 7C may be adopted. In FIGS. 6A to 7C, the bridge circuit 110, the operational amplifier 120, the comparator 140 and the triangular wave oscillator 160 are omitted.

FIGS. 6A to 6D and FIGS. 7A to 7C are circuit diagrams showing modifications of the thermostatic-chamber temperature control device according to the first embodiment.

Figure 6A:
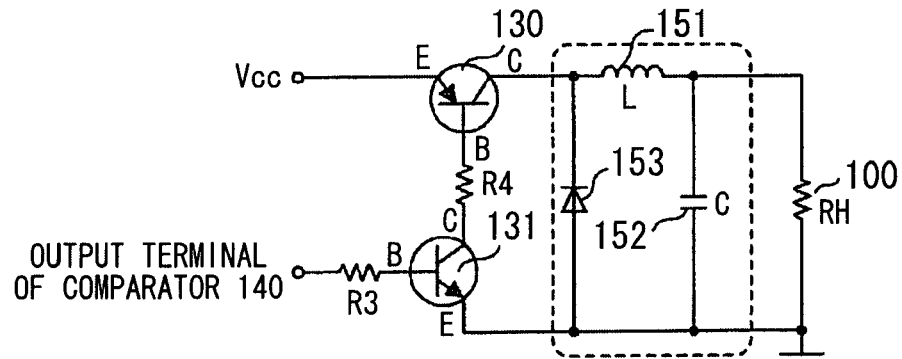
FIGS. 6A to 6D are diagrams showing modifications of the thermostatic-chamber temperature control device according to the first embodiment.

FIG. 6A is a circuit diagram in which the transistor 130 is a PNP type transistor, and a transistor 131 as a second switching element is connected between the base of the transistor 130 and the comparator 140.

The transistor 131 is an NPN type transistor. The collector of the transistor 131 is connected to the base of the transistor 130 through a resistor R4, the emitter of the transistor 131 is grounded, and the base of the transistor 131 is connected to the output terminal of the comparator 140 through a resistor R3.

Furthermore, a smoothing filter 150 contains a diode 153. The output terminal of the diode 153 is connected to the midpoint between the collector of the transistor 130 and a coil 151, and the input terminal of the diode 153 is grounded. By inserting the diode 153 into the smoothing filter 150 as described above, ripple current occurring along with the turn-off of the transistor 130 is reduced, and, and the current output from the collector of the transistor 130 is more efficiently smoothed.

According to the circuit construction as described above, when the transistor 131 is turned on by the PWM signal output from the comparator 140, the transistor 130 is turned on, and the current corresponding to the unbalanced voltage of the bridge circuit 110 is supplied to the heater 100.

Figure 6B:
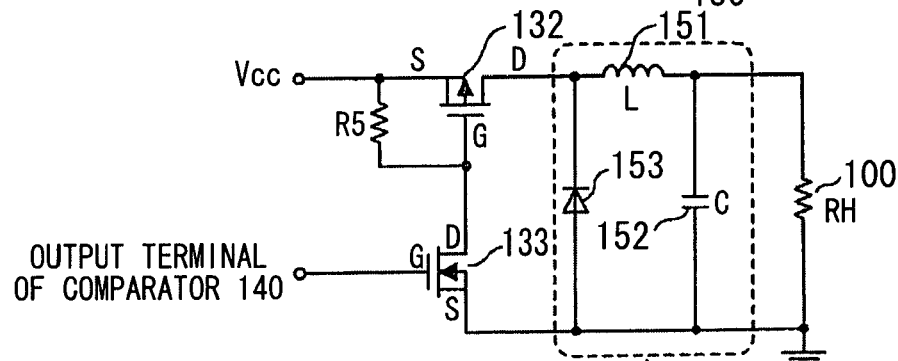

In the thermostatic-chamber temperature control device shown in FIG. 6B, a PNP type FET 132 is connected in place of the transistor 130 shown in FIG. 5, and an NPN type FET 133 as a second switching element is connected in place of the transistor 131 shown in FIG. 6A. A resistor R5 is connected between the gate and source of FET 132.

When FET 133 is turned on by the PWM signal, FET 132 is turned on, and the current corresponding to the unbalanced voltage of the bridge circuit 110 is supplied to the heater 100.

Figure 6C:
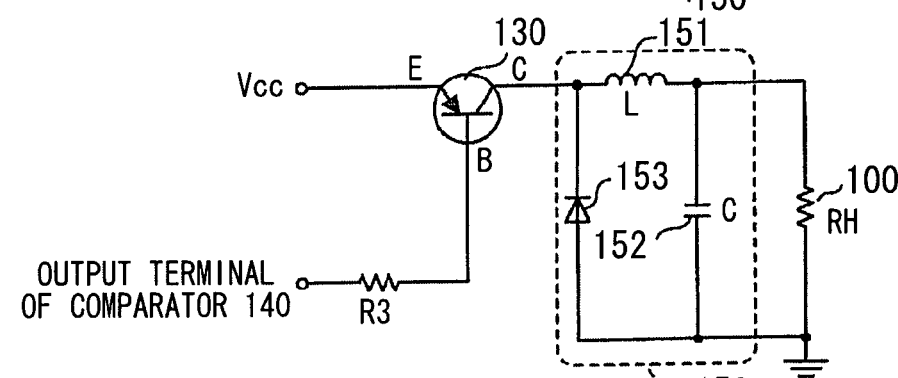

In the thermostatic-chamber temperature control device shown in FIG. 6C, the transistor 130 shown in FIG. 5 is a PNP type transistor.

Furthermore, the smoothing filter 150 contains a diode 153. The output terminal of the diode 153 is connected to the midpoint between the collector of the transistor 130 and the coil 151, and the input terminal of the diode 153 is grounded. By inserting the diode 153 into the smoothing filter 150 as described above, the current output from the collector of the transistor 130 is more efficiently smoothed.

According to the circuit construction as described above, when the transistor 130 is turned on by the PWM signal output from the comparator 140, the current corresponding to the unbalanced voltage of the bridge circuit 110 is supplied to the heater 100.

Figure 6D:
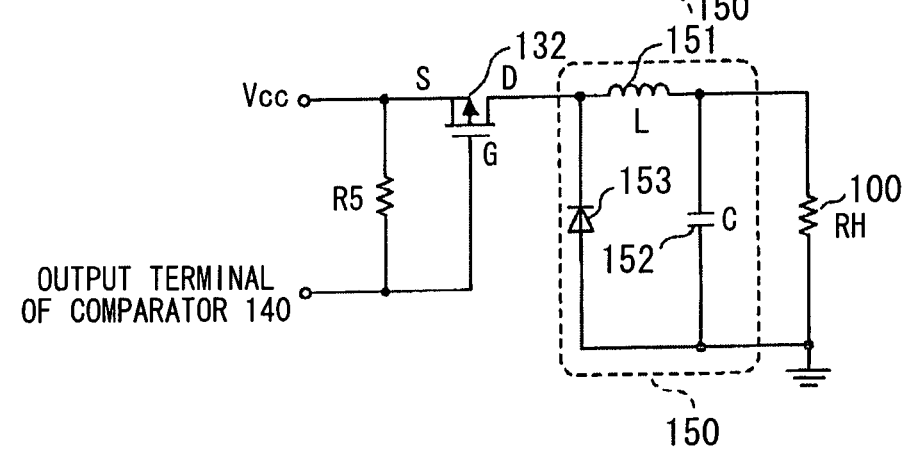

In the thermostatic-chamber temperature control device shown in FIG. 6D, PNP type FET 132 is connected in place of the transistor 130 shown in FIG. 6C.

When FET 132 is turned on by the PWM signal output from the comparator 140, the current corresponding to the unbalanced voltage of the bridge circuit 110 is supplied to the heater 100.

Figure 7A:
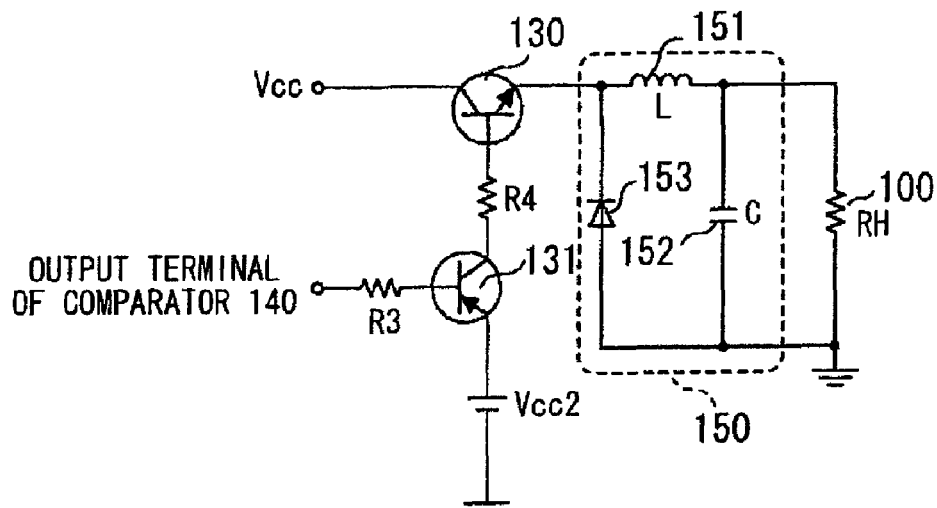
FIGS. 7A to 7C are diagrams showing modifications of the thermostatic-chamber temperature control device according to the first embodiment.

In the thermostatic-chamber temperature control device shown in FIG. 7A, the PNP type transistor 131 as the second switching element is connected between the base of the NPN type transistor 130 shown in FIG. 5 and the output terminal of the comparator 140.

A second power supply (Vcc2) is connected to the emitter of the transistor 131. The voltage value Vcc2 of the second power supply is set so as to satisfy the relation of Vcc2>Vcc.

The smoothing filter 150 contains a diode 153. The output terminal of the diode 153 is connected to the midpoint between the collector of the transistor 130 and the coil 151, and the input terminal of the diode 153 is grounded. By inserting the diode 153 into the smoothing filter 150 as described above, the current output from the collector of the transistor 130 is more efficiently smoothed.

When the transistor 131 is turned on by the PWM signal output from the comparator 140, the transistor 130 is turned on, and the current corresponding to the unbalanced voltage of the bridge circuit 110 is supplied to the heater 100.

Figure 7B:
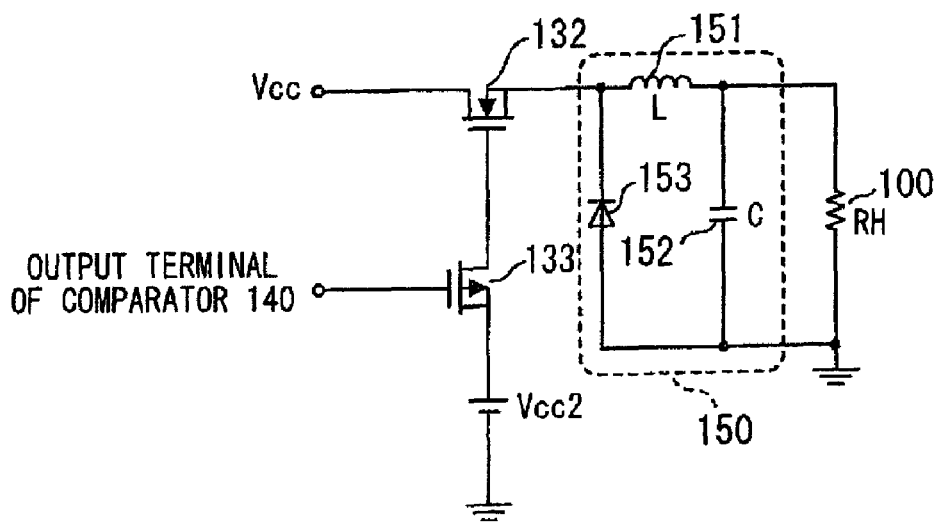

In the thermostatic-chamber temperature control device shown in FIG. 7B, the NPN type FET 132 is connected in place of the transistor 130 shown in FIG. 7A, and the PNP type FET 133 is connected in place of the transistor 131. The other construction is the same as the circuit shown in FIG. 7A.

When FET 133 is turned on by the PWM signal output from the comparator 140, FET 132 is turned on, and the current corresponding to the unbalanced voltage of the bridge circuit 110 is supplied to the heater 100.

Figure 7C:
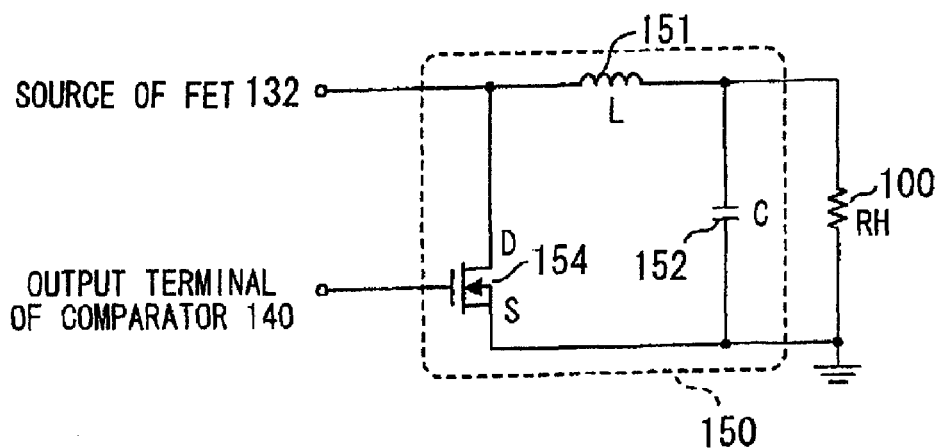

In the thermostatic-chamber temperature control device shown in FIG. 7C, NPN type FET 154 is connected in place of the diode 153 shown in FIG. 7B. The other construction is the same as the circuit shown in FIG. 7B.

The PWM signal output from the comparator 140 is input to FET 154, and thus FET 154 is turned on in synchronism with FET 133. Accordingly, when FETs 132 and 133 are turned on and current output from the source of FET 132 flows into the smoothing circuit 150, the current is efficiently smoothed because FET 154 is turned on.

In the foregoing description, the various modifications of the thermostatic-chamber temperature control device according to the first embodiment are shown in FIGS. 6A to 7C. In all the modifications, the power consumption of the transistors 130 and 131 or FETs 132 and 133 is substantially equal to zero.

Therefore, the temperature increase of the transistors 130, 131 or FETs 132, 133 can be suppressed more greatly as compared with the conventional thermostatic-chamber temperature control device, and the thermostatic-chamber temperature control device which can maintain high reliability for a long term can be provided.

The temperature increase of the transistors 130, 131 or FETs 132, 133 for driving the heater 100 can be suppressed, and thus transistors which are more compact as compared with the conventional thermostatic-chamber temperature control device can be used. Accordingly, the thermostatic-chamber temperature control device can be designed to be more compact than the conventional thermostatic-chamber temperature control device.

The thermostatic-chamber temperature control device according to the first embodiment can be installed in a highly stable oscillator used in communication equipment, information equipment, measuring equipment, broadcast equipment, etc., and for example, OCXO, a rubidium atomic oscillator or a cesium atomic oscillator may be used as the oscillator.

Second Embodiment

Figure 8A:
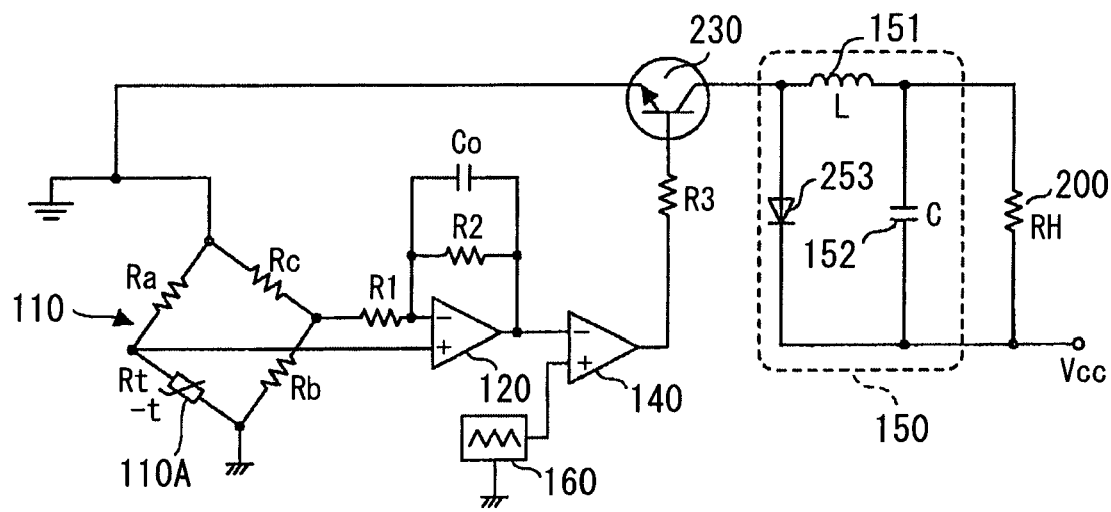
FIG. 8A shows an example of a circuit having a transistor as a switching element for driving a heater in a thermostatic-chamber temperature control device according to a second embodiment.
Figure 8B:
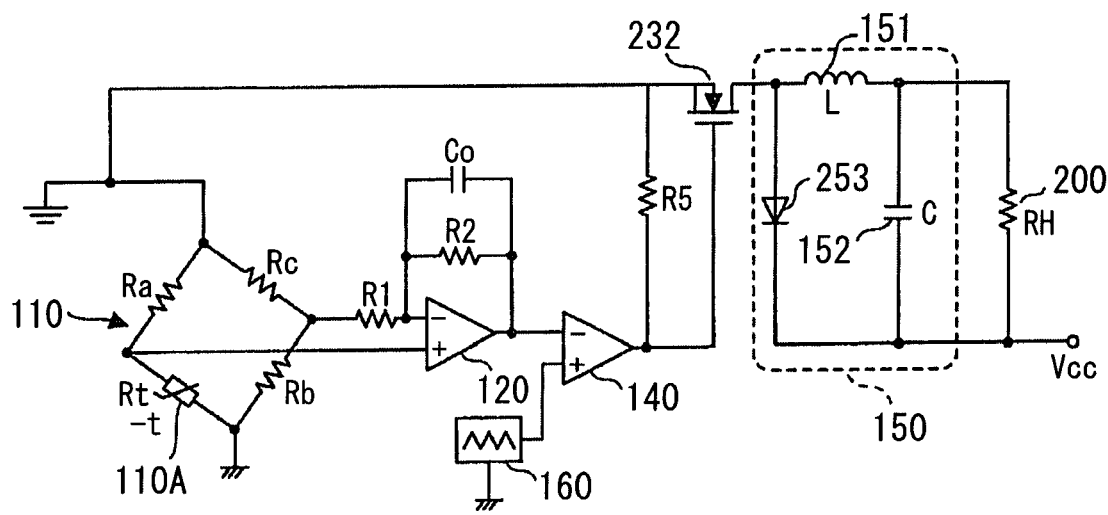
FIG. 8B shows an example of a circuit having FET as a switching element for driving the heater in the thermostatic-chamber temperature control device according to the second embodiment.

FIGS. 8A and 8B are circuit constructions of a thermostatic-chamber temperature control device according to a second embodiment, wherein FIG. 8A shows a circuit having a transistor as a switching element for driving the heater, and FIG. 8B shows a circuit having FET as a switching element for driving the heater.

As shown in FIG. 8A, the thermostatic-chamber temperature control device according to the second embodiment is different from the thermostatic-chamber temperature control device according to the first embodiment in the connection relation of a power supply (Vcc), a heater 200, a transistor 230, a diode 253 and a ground point. Specifically, the positions of the power supply (Vcc) and the ground point are interchanged to each other, and the connection relation of the heater 200, the transistor 230 and the diode 253 is changed due to the above positional interchange. The other construction is the same as the thermostatic-chamber temperature control device according to the first embodiment. The same or corresponding constituent elements are represented by the same reference numerals, and the description thereof is omitted.

One end of the heater 200 is connected to the power supply (Vcc), and the other end thereof is connected to the connection point between the coil 151 and the capacitor 152 of the smoothing filter 150. As described above, only the connection relation is different, and the heater 200 itself is identical to the heater 100 of the first embodiment.

With respect to the transistor 230, the collector serving as a current input terminal is connected to the coil 151 of the smoothing filter 150, the emitter serving as a current output terminal is grounded, and the base serving as a control terminal is connected to the output terminal of the comparator 140. As described above, only the connection relation is different, and the transistor 230 itself is identical to the transistor 130 according to the first embodiment.

The diode 253 is connected so that the rectifying direction thereof is opposite to that of the first embodiment in connection with the change of the connection relation of the heater 200 and the transistor 230. Only the connection relation is different, and the diode 253 itself is identical to the diode 153 of the first embodiment.

In the thermostatic-chamber temperature control device according to the second embodiment as described above, when PWM signal output from the comparator 140 is input to the base of the transistor 230, the collector and the emitter are conducted to each other, and current is supplied from the power supply (Vcc) to the heater 200. The current supplied to the heater 200 has the current value corresponding to the duty ratio of the PWM signal, and thus the current corresponding to the unbalanced voltage of the bridge circuit 110 is supplied to the heater 200.

Furthermore, the thermostatic-chamber temperature control device shown in FIG. 8B is different from the thermostatic-chamber temperature control device shown in FIG. 8A in that NPN type FET 232 is connected in place of the transistor 230 shown in FIG. 8A. The other construction is identical to that of the thermostatic-chamber temperature control device shown in FIG. 8A. The same or corresponding constituent elements are represented by the same reference numerals, and the description thereof is omitted.

With respect to FET 232, the drain serving as a current input terminal is connected to the coil 151 of the smoothing filter 150, the source serving as a current output terminal is grounded, and the gate serving as a control terminal is connected to the output terminal of the comparator 140.

In the thermostatic-chamber temperature control device as described above, when the PWM signal output from the comparator 140 is input to the gate of FET 232, the resistance between the drain and the source is reduced, and current is supplied from the power supply (Vcc) to the heater 200. The current supplied to the heater 200 has the current value corresponding to the duty ratio of the PWM signal, and thus the current corresponding to the unbalanced voltage of the bridge circuit 110 is supplied to the heater 200.

As described above, in the thermostatic-chamber temperature control device according to the second embodiment, the power consumption of the transistor 230 or FET 232 is substantially equal to zero.

Therefore, the temperature increase of the transistor 230 or FET 232 can be suppressed more greatly as compared with the conventional thermostatic-chamber temperature control device, and thus the thermostatic-chamber temperature control device which can maintain high reliability for a long term can be provided.

Furthermore, the temperature increase of the transistor 230 or FET 232 for driving the heater 200 can be suppressed, and thus a transistor which is more compact than that of the conventional thermostatic-chamber temperature control device can be used. Accordingly, the thermostatic-chamber temperature control device can be more miniaturized as compared with the conventional one.

Third Embodiment

Figure 9:
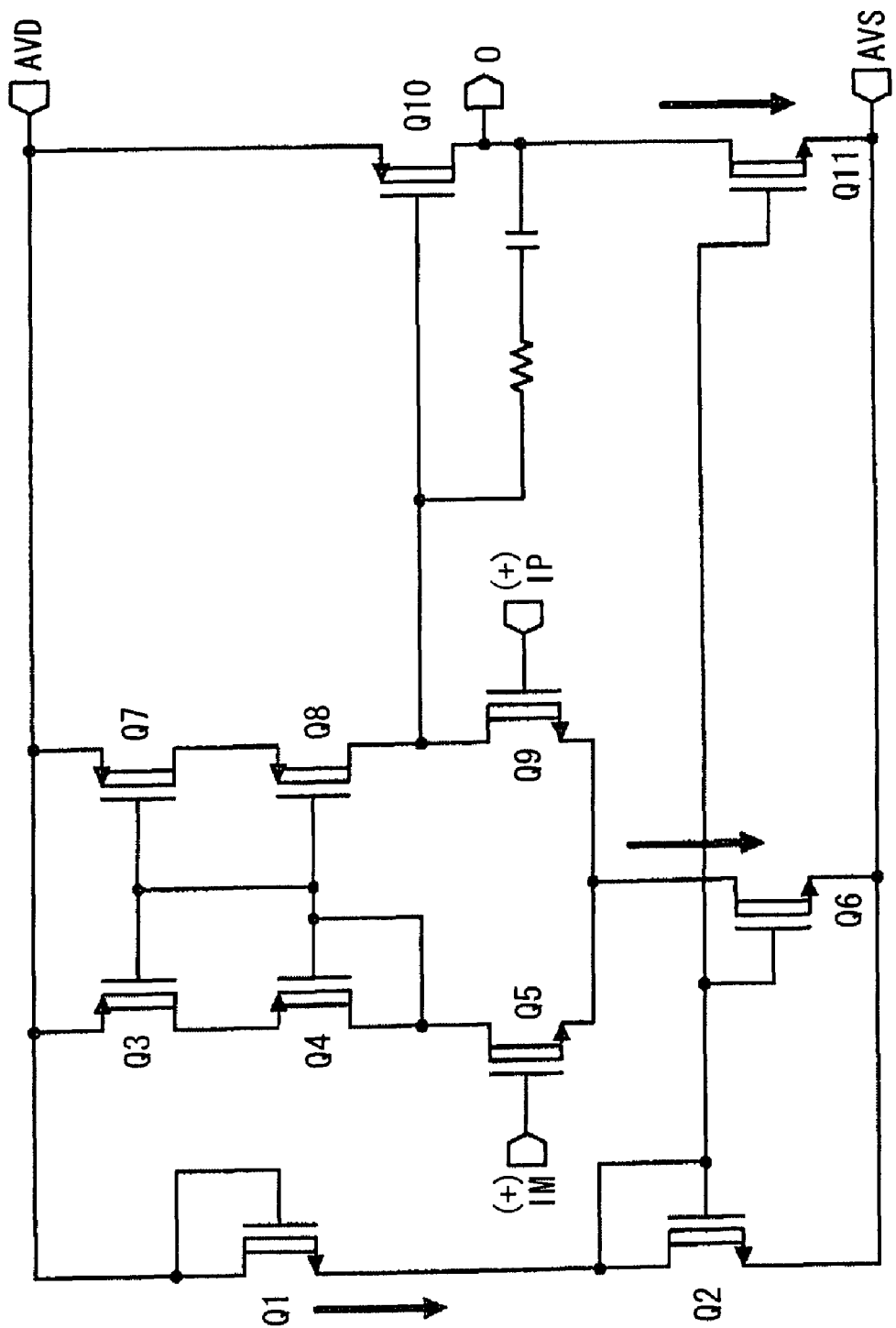
FIG. 9 shows an example of the circuit construction of an operational amplifier of a thermostatic-chamber temperature control device according to a third embodiment.

FIG. 9 is a diagram showing the circuit construction of an operational amplifier of a thermostatic-chamber temperature control device according to a third embodiment.

In the first embodiment, the thermostatic-chamber temperature control device is provided as a discrete part. However, in the third embodiment, the bridge circuit 110, the operational amplifier 120, the transistor 130 and the comparator 140 are manufactured as an integrated circuit. In this case, the circuit construction of the operational amplifier 120 implemented as an integrated circuit will be described.

As shown in FIG. 9, the operational amplifier 120 according to the third embodiment is manufactured by integrating MOSFETs (Metal Oxide Silicon Field Effect Transistor). In the circuit shown in FIG. 9, an IP terminal represents a noninverting input terminal, an IM terminal represents an inverting input terminal, an AVD terminal represents a power supply (Vcc), 0 represents an output and an AVS terminal represents the ground potential.

The operational amplifier 120 contains MOSFETs Q1 to Q1. Q1 and Q2 are MOSFETs for generating reference current to be supplied to Q6 serving as a constant current circuit. Q3, Q4, Q5, Q7, Q8 and Q9 are MOSFETs serving as an operating circuit at an input stage, and Q6 is MOSFET serving as a constant current circuit for outputting fixed current. Q10 and Q11 are MOSFETs serving as a buffer circuit for outputting a comparison result of the operational amplifier from the O terminal (output terminal) to the outside.

As shown in FIG. 9, the operational amplifier 120 can be manufactured by integrated MOSFETs, and thus it can be manufactured by a normal semiconductor manufacturing process.

As described above, according to the third embodiment, the bridge circuit 110, the operational amplifier 120, the transistor 130 and the comparator 140 which are contained in the thermostatic-chamber temperature control device can be manufactured as an integrated circuit.

The integration is not necessarily applied to all of the bridge circuit 110, the operational amplifier 120, the transistor 130 and the comparator 140, and it may be applied to at least one of them.

Furthermore, when the operational amplifier is used as the PWM signal generating circuit in place of the comparator 140, the operational amplifier as the PWM signal generating circuit may be designed as the same integration circuit as the operational amplifier 120.

The illustrative thermostatic-chamber temperature control device according to the embodiments of the present invention has been described above. However, the present invention is not limited to the embodiments disclosed above, and various modifications and alterations may be made without departing from the subject matter of the present invention.

The embodiment described above is a preferred exemplary embodiment. The present invention is not limited to this but various modifications can be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A thermostatic-chamber temperature control device comprising:
   a heating element for heating a thermostatic chamber;
   a bridge circuit having a temperature sensitive element whose resistance value varies in accordance with the temperature of the heating element;
   a detection circuit for detecting an unbalanced voltage in the bridge circuit;
   a PWM signal generating circuit for generating a PWM signal corresponding to the unbalanced voltage detected by the detection circuit;
   a switching element that has a current output terminal which supplies current to the heating element, and a current input terminal connected to a power supply circuit and is driven on the basis of the PWM signal generated by the PWM signal generating circuit; and
   a second switching element that is disposed between a current control terminal of the switching element and the PWM signal generating circuit and is driven on the basis of the PWM signal, wherein the switching element is driven by the second switching element.

2. The thermostatic-chamber temperature control device according to claim 1, further comprising:
   a smoothing circuit disposed between the heating element and the current output terminal which smoothes current supplied to the heating element.

3. The thermostatic-chamber temperature control device according to claim 2, wherein the smoothing circuit contains a rectifying element.

4. The thermostatic-chamber temperature control device according to claim 1, wherein at least one of the bridge circuit, the detection circuit, the PWM signal generating circuit and the switching element is an integrated circuit.

\* \* \* \* \*